(12) United States Patent
Kawano (10) Patent No.: US 6,459,856 B2
(45) Date of Patent: Oct. 1, 2002

(54) CONTROL DIAL DEVICE OF A CAMERA (75) Inventor: Kiyoshi Kawano, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/907,605

(22) Filed: Jul. 19, 2001

(30) Foreign Application Priority Data

Jul. 27, 2000 (JP) .......................... 2000-226797

(51) Int. Cl.$^7$ ................................ G03B 17/18
(52) U.S. Cl. .................. 396/287; 396/299; 396/543
(58) Field of Search ........................ 396/287, 292, 396/543, 297, 299

(56) References Cited

U.S. PATENT DOCUMENTS

| | | |
|---|---|---|
| 4,853,726 A | 8/1989 | Kawamura et al. |
| 4,933,697 A | 6/1990 | Kawamura et al. |
| 5,742,853 A | 4/1998 | Haga et al. |
| 5,749,005 A | 5/1998 | Haga et al. |
| 5,761,554 A | 6/1998 | Karigaya et al. |
| 6,067,424 A * | 5/2000 | Shono ................ 396/297 |

OTHER PUBLICATIONS

A catalog entitled "Minolta Hi–Tech Autofocus SLR System—The Professional Hi–Tech Autofocus SLR 9000", pp. 31, 35, 37, 39, and 41.
Japanese Language catalog entitled "Minolta –9000".

* cited by examiner

Primary Examiner—David M. Gray
(74) Attorney, Agent, or Firm—Greenblum & Bernstein, P.L.C.

(57) ABSTRACT

A camera having a control dial/display panel unit includes a ring member which can be manually rotated about a first axis; a display panel which is surrounded by the ring member so as to be viewed through an aperture of the ring member from outside the camera; a rotational member which is rotatable about a second axis which is inclined with respect to the first axis; a transmission device for transmitting the rotation of the ring member to the rotational member; a detection device which is disposed on the rotational member to detect rotation information of the rotational member; and a controller which determines rotation information of the ring member via the rotation information of the rotational member, which is detected by the detection device, to indicate information corresponding to the rotation information of the ring member on the display panel.

24 Claims, 11 Drawing Sheets

CONTROL DIAL DEVICE OF A CAMERA

BACKGROUND OF THE INVENTION

1. Field of the Invention

The present invention relates to a camera (e.g., a conventional camera using sensitive film, a hand-held video recorder, or a digital camera), having a control dial through which a display panel can be viewed.

2. Description of the Prior Art

Figure 11:
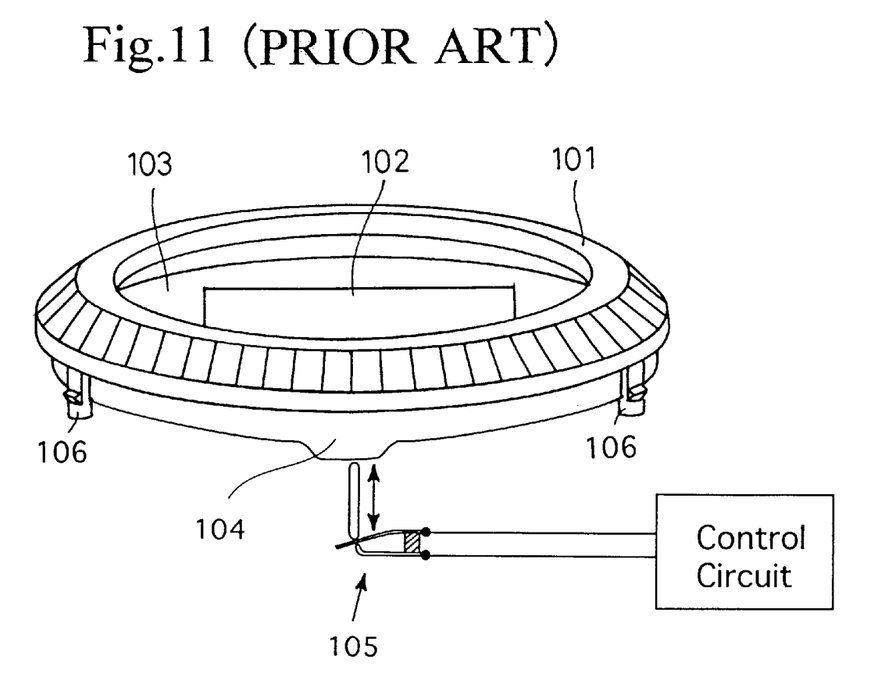
FIG. 11 is a perspective view of a control dial and display panel arrangement of a conventional camera.

A camera which is provided on a camera body thereof with a control dial (e.g., a mode select dial) through which a display panel (e.g., an LCD panel or an LED panel which is surrounded by the control dial) can be viewed, is known in the art. FIG. 11 is a perspective view of such a combination of a control dial 101 and an LCD panel 102 on the top panel (not shown) of an SLR camera. The control dial 101 is manually turned to select, e.g., an exposure mode from a plurality of exposure modes including a manual photometering mode, an aperture-priority auto-exposure mode and a programmed auto exposure mode. As can be seen in FIG. 11, information indicated by the LCD panel 102 is read through a circular transparent window plate 103 fitted in the center opening of the control dial 101. The LCD panel 102 indicates, e.g., information corresponding to the rotational position of the control dial 101.

The control dial 101 is provided with a switching protrusion 104 which protrudes downward from an outer periphery thereof. The protrusion 104 turns ON and OFF a plurality of switches 105 (only one is shown in FIG. 11) which are arranged on a circle the protrusion 104 moves, upon rotation of the dial 101. A plurality of pins 106 prevent the dial 101 from detaching from a camera body. The rotational position (rotational angle) of the control dial 101 is detected by the switches 105 which are turned ON by the protrusion 104 when the dial 101 is rotated.

Figure 12:
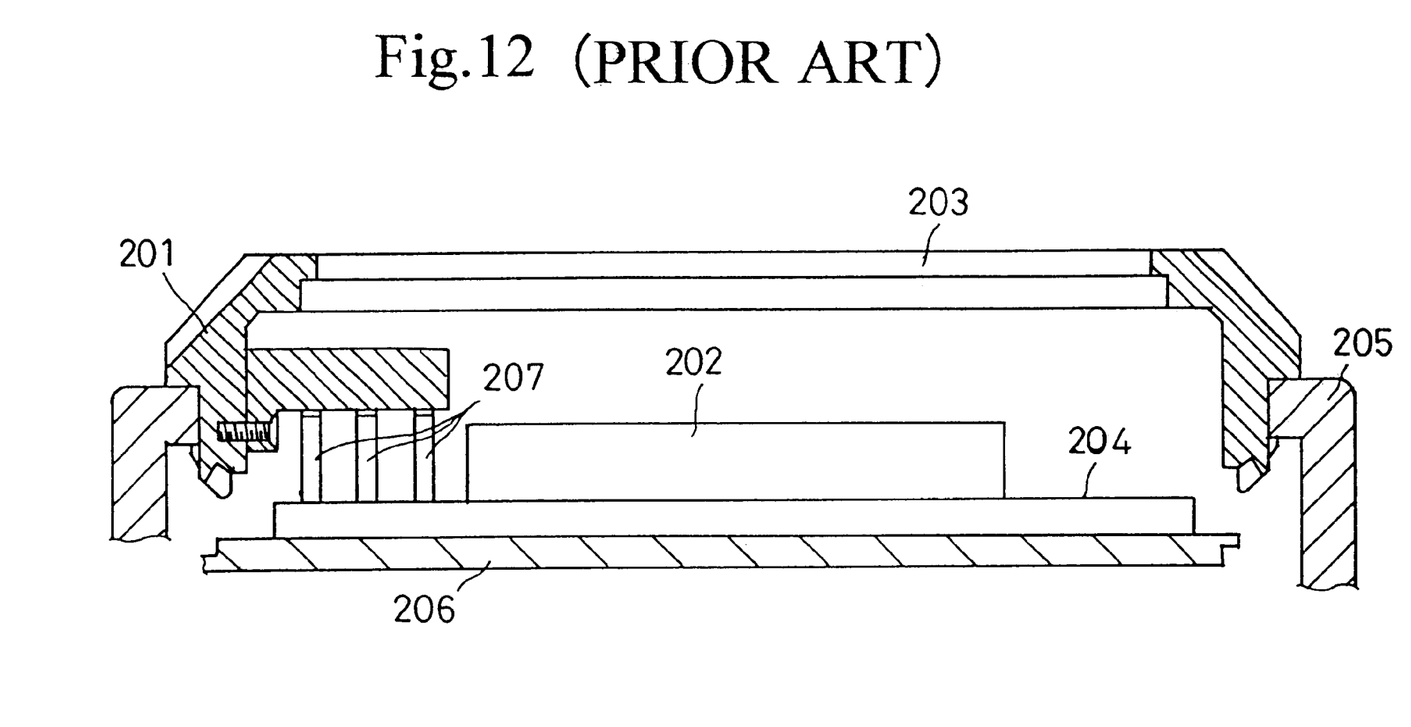
FIG. 12 is a longitudinal cross-sectional view of a control dial and display panel on another conventional camera.

In such a control dial, the rotational position thereof can be detected only at wide intervals, and therefore cannot fill the needs of providing the control dial with many detectable rotational positions with fine precision. FIG. 12 shows a combination of a control dial 201 provided on an external panel 205 and a display panel 202 of another conventional camera which provides a solution to the above-described problem. In this example, a code plate 204, which has a predetermined conductive code pattern (not shown) printed thereon, is fixed to a frame 206 of a camera body, and a brush 207 having a plurality of electrical contacts which come in sliding contact with the conductive code pattern of the code plate 204 is fixed to an inner peripheral portion of the control dial 201. The rotational position of the control dial 201 is detected via the brush 207 and the code plate 204. The display panel 202 is mounted onto the center of the code plate 204 so that information indicated by the display panel 202 can be read through a transparent window plate 203 fitted in a circular opening formed in the center of the control dial 201.

In the control dial 201, since the brush 207 is positioned inside the control dial 201, the display panel 202 has to be small so as not to interfere with the brush 207; however, this does not allow for a large display panel.

Figure 13:
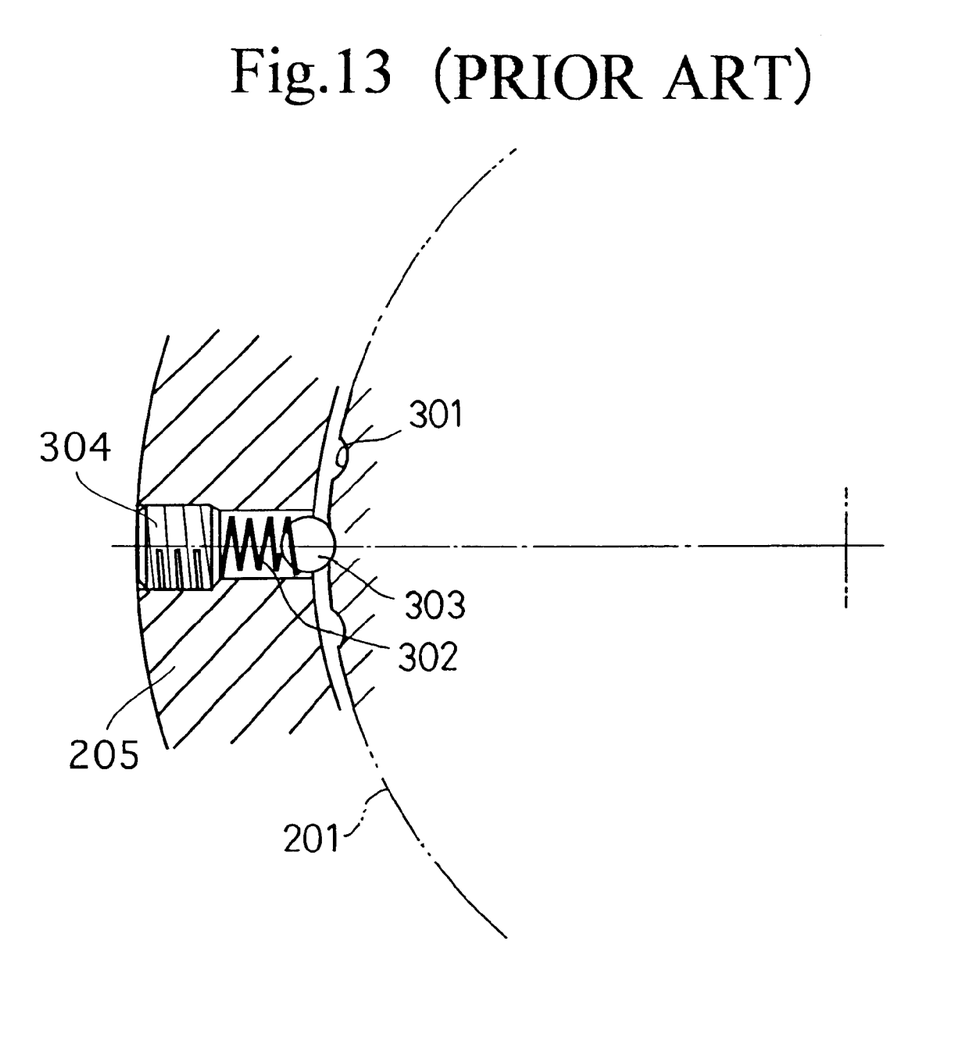
FIG. 13 is a cross-sectional view of a conventional mechanism which provides the control dial shown in FIG. 12 with a clicking action which prevents the control dial from rotating unintentionally.

FIG. 13 shows a conventional mechanism wherein the control dial 201 has a clicking action upon rotation thereof, which prevents the control dial from rotating unintentionally. Namely, a click mechanism is provided on an outer peripheral face of the control dial 201 with a plurality of notches 301, and is further provided with a steel ball 303 which can be engaged in each notch 301, a compression coil spring 302 which normally biases the steel ball 303 against the outer peripheral face of the control dial 201, and a screw 304 which is screwed into a radial through hole formed in the external panel 205 to hold the compression coil spring 302 and the steel ball 303 between the screw 304 and the outer peripheral face of the control dial 201.

In such a mechanism, a space for arranging the compression coil spring 302 and the steel ball 303 is required and at the same time a device including the screw 304 for preventing the compression coil spring 302 and the steel ball 303 from coming out of the through hole accidentally is also required, which complicates the structure of the mechanism.

SUMMARY OF THE INVENTION

The present invention has been made in view of the aforementioned problems described above, and accordingly, an object of the present invention is to provide a camera having a control dial through which a display panel can be viewed, wherein the rotational position of the control dial can be detected at close intervals with fine precision, and wherein the display panel, which is surrounded by the control dial, is large.

Another object of the present invention is to provide a camera having a control dial and a display panel, wherein the camera is provided with a simple mechanism which provides the control dial with a clicking action, upon rotation thereof, which prevents the control dial from rotating unintentionally.

To achieve the objects mentioned above, according to an aspect of the present invention, a camera having a control dial/display panel unit is provided, the control dial/display panel unit including a ring member which can be manually rotated about a first axis; a display panel which is surrounded by the ring member so as to be viewed through an aperture of the ring member from outside the camera; a rotational member which is rotatable about a second axis which is inclined with respect to the first axis; a transmission device for transmitting the rotation of the ring member to the rotational member; a detection device which is disposed on the rotational member to detect rotation information of the rotational member; and a controller which determines rotation information of the ring member via the rotation information of the rotational member, which is detected by the detection device, to indicate information corresponding to the rotation information of the ring member on the display panel.

Preferably, the rotation information of the ring member includes information on a direction of rotation of the ring member.

In an embodiment, the rotation information of the ring member includes information on a rotational angle of the ring member.

In an embodiment, the rotation information of the ring member includes information on an absolute rotational angle of the ring member.

Preferably, a transparent window plate is further provided, which is fitted in the aperture of the ring member.

Preferably, the display panel has a polygonal shape including at least eight sides, the perimeter of the display panel being positioned closely to an inner peripheral surface of the ring member without coming in contact therewith.

Preferably, the transmission device includes a first gear formed on an inner peripheral surface of the ring member, and a second gear which is formed on an outer peripheral surface of the rotational member to be in mesh with the first gear.

The detection device can include a code plate having a predetermined conductive code pattern, the code plate being mounted to the rotational member, and a brush which comes into contact with the predetermined conductive code pattern.

Preferably, the control dial/display panel unit further includes a plurality of notches formed on an inner peripheral surface of the ring member, a support which supports the display panel, a hole formed on the support, a ball positioned in the hole, a biasing member positioned in the hole to bias the ball toward the inner peripheral surface of the ring member so that the ball can be engaged in one of the plurality of notches with a click, and a brush holding member which holds the brush. The support includes an insertion opening which communicatively connects with the hole so that the ball and the biasing member can be inserted into the hole via the insertion opening. The brush holding member includes a protrusion which is engaged in the insertion opening to prevent the ball and the biasing member from coming out of the hole via the insertion opening.

The biasing member can be a compression coil spring.

Preferably, the ring member, the rotational member and the detection device are mounted to an external cover of the camera.

Preferably, the second axis is inclined with respect to the first axis by an angle one of greater than and equal to 25 degrees and one of less than and equal to 35 degrees.

In an embodiment, the first axis is inclined with respect to a vertical direction of the camera.

In an embodiment, the second axis extends in substantially a vertical direction of the camera.

Preferably, the display panel is an LCD.

Preferably, the rotational member is in the shape of a disc.

Preferably, the control dial/display panel unit further includes a click mechanism which provides the ring member with a clicking action upon rotation thereof which prevents the ring member from being rotated unintentionally.

In an embodiment, the display panel has an octagonal shape.

Preferably, the brush holding member is fixed to the support, and the rotational member is mounted to the support via the brush holding member.

Preferably, the plurality of notches are formed on the inner peripheral surface of the ring member at equi-angular intervals.

Preferably, the brush holding member is fixed to a bottom surface of the support.

The control dial/display panel unit can further include a rotational cylinder to which the rotational member is fixed; wherein the brush holding member includes a pivot on which the rotational cylinder is fitted to be rotatable about the pivot.

In an embodiment, the ring member includes a first gear formed on an inner peripheral surface of the ring member, and the rotational member includes a second gear which is formed on an outer peripheral surface of the rotational member to be in mesh with the first gear. The plurality of notches can be formed along a circumference of the ring member above the first gear.

According to another aspect of the present invention, a control dial/display panel unit is provided, including a ring member which can be manually rotated; a display panel which is surrounded by the ring member so as to be viewed through an aperture of the ring member from outside the camera; a rotational disc positioned below the display panel obliquely to the ring member; a transmission device for transmitting rotation of the ring member to the rotational disc; and a detection device which detects information on rotation of the rotational disc. The display panel indicates information corresponding to rotation information of the ring member which is determined via rotation information of the rotational disc which is detected by the detection device.

The present disclosure relates to subject matter contained in Japanese Patent Application No. 2000-226797 (filed on Jul. 27, 2000) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENTS

Figure 1:
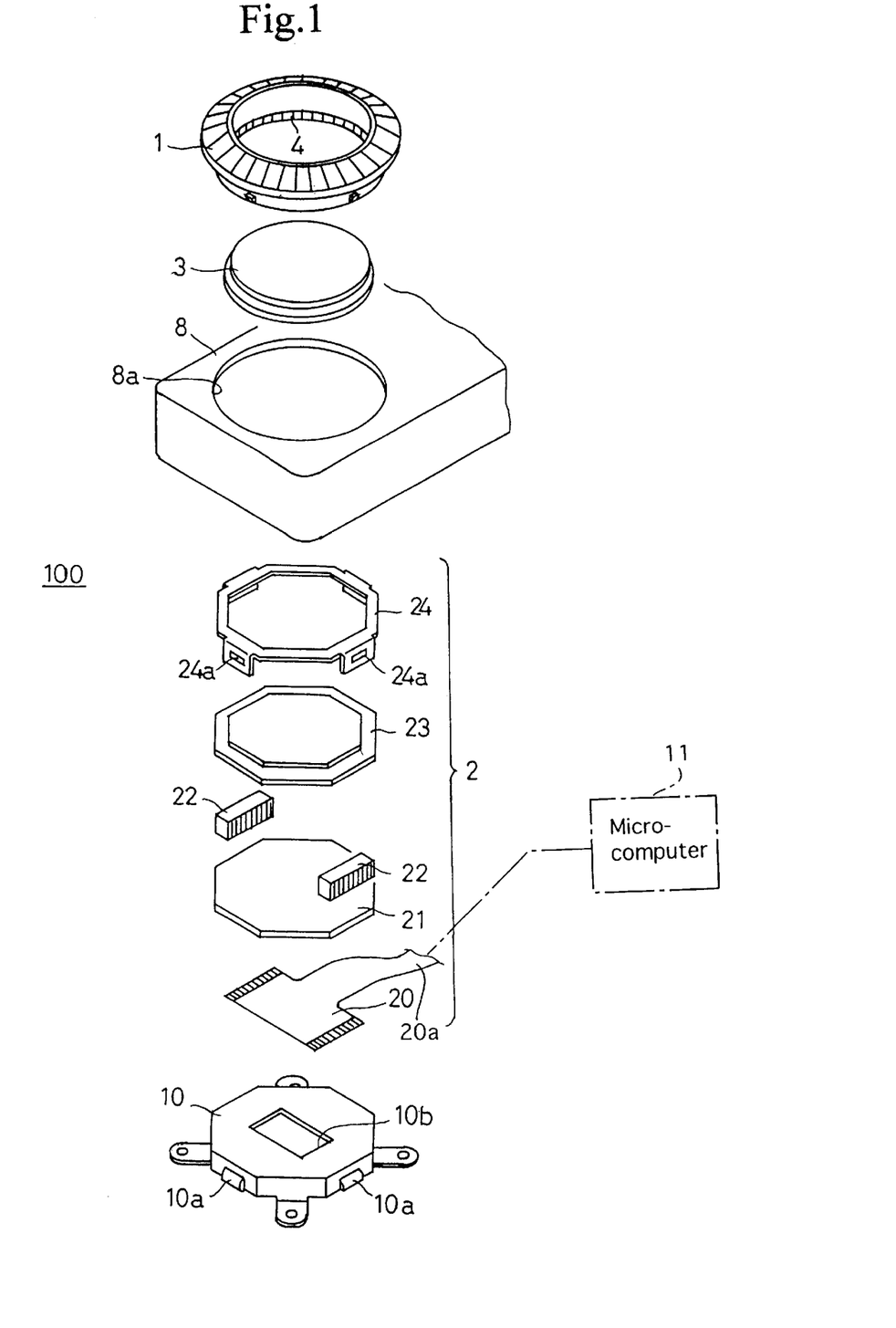
FIG. 1 is an exploded perspective view of fundamental elements of the first embodiment of a control dial and display panel arrangement, which is provided on a camera, according to the present invention.

FIGS. 1 through 4 show the first embodiment of a control dial and display panel arrangement provided on a camera. A control dial/display panel unit 100 is provided with a control dial (a ring member) 1 and a display panel 2. The control dial 1 can be manually turned to select, e.g., an exposure mode from a plurality of exposure modes. The control dial 1 is rotatably fitted in a circular aperture 8*a* formed on a top cover (an external cover) 8 of a camera body. A circular transparent window plate 3 which is formed from, e.g., an acrylic resin, is fixedly fitted in a circular aperture formed in the center of the control dial 1 from the bottom thereof. Information indicated by the display panel 2 thereon can be read by the user (photographer) through the transparent window plate 3 from outside the camera. The control dial 1 is provided on an inner-lower peripheral surface thereof with an internal gear (first gear) 4. The control dial/display panel unit 100 is provided, in the top cover 8 below the rotary ring 1, with an LCD support 10. The display panel 2 includes a flexible PWB (flexible printed wiring board) 20, an LCD back light member 21, two conductive rubbers 22, and an LCD 23, and is mounted onto the LCD support 10. The flexible PWB 20, the LCD back light member 21, the two conductive rubbers 22, and the LCD 23 are fixed to the LCD support 10 with a holding frame 24 having four engaging slits 24*a* (only two of them are shown in FIG. 1) in which corresponding four engaging claws 10*a* (only two of them are shown in FIG. 1) formed around the LCD support 10 are engaged.

A wiring strip portion 20*a* of the flexible PWB 20 is inserted in a rectangular opening 10*b* formed on the LCD support 10 to be connected to a microcomputer (controller) 11 (shown by a one-dot chain line in FIG. 1) provided in the camera as a controller therefor. The LCD support 10 is fixed to an inner face of the top cover 8 via four set screws 10*c* so that the LCD support 10 is positioned immediately below the transparent window plate 3.

In the above-described structure, information indicated by the display panel 2 thereon can be read through the transparent window plate 3 from outside the camera, while the display panel 2 does not move relative to the top cover 8 if the control dial 1 is turned.

Figure 2:
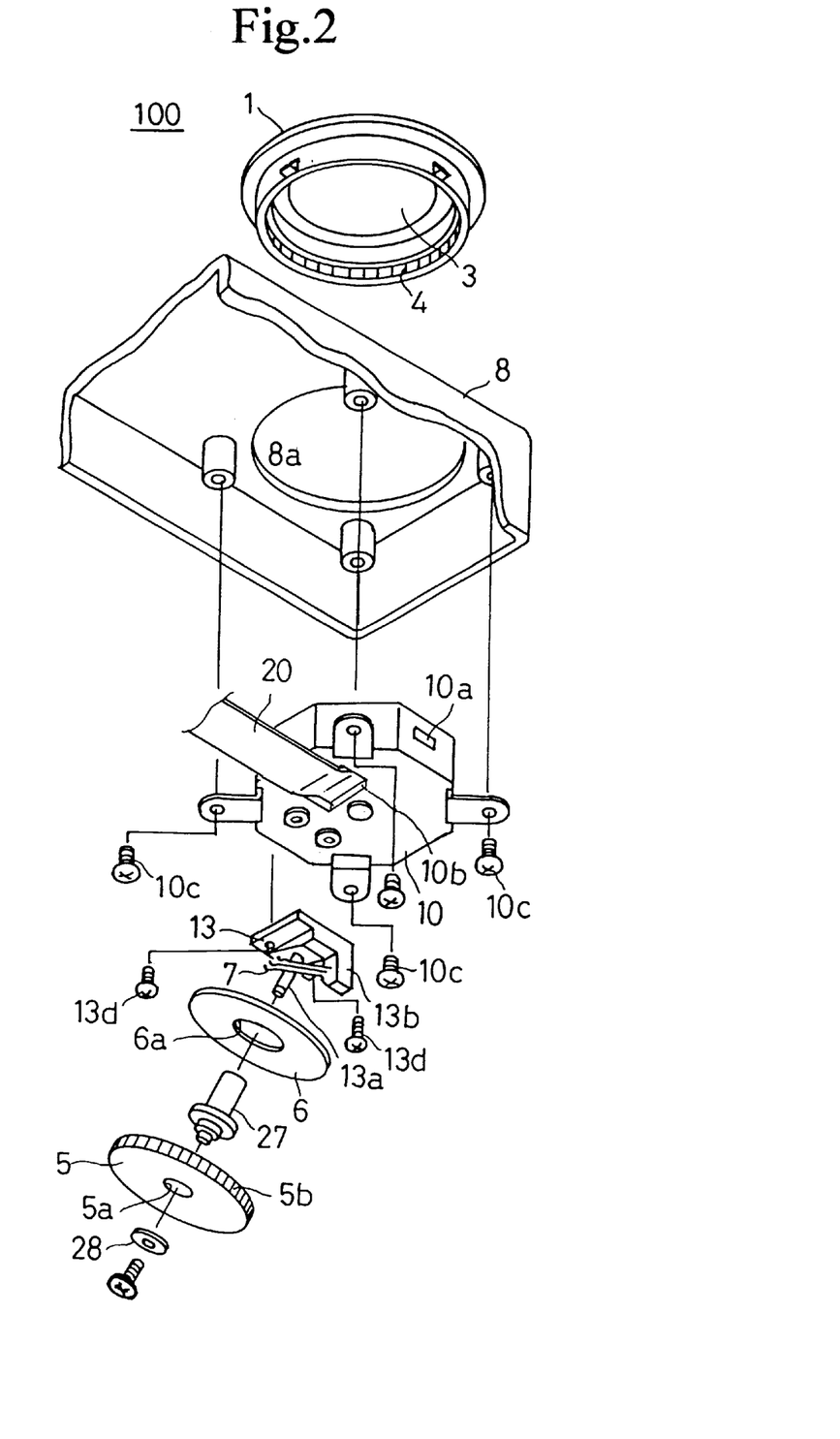
FIG. 2 is an exploded perspective view of fundamental elements of the first embodiment of the control dial and display panel arrangement, seen from a different angle.
Figure 3:
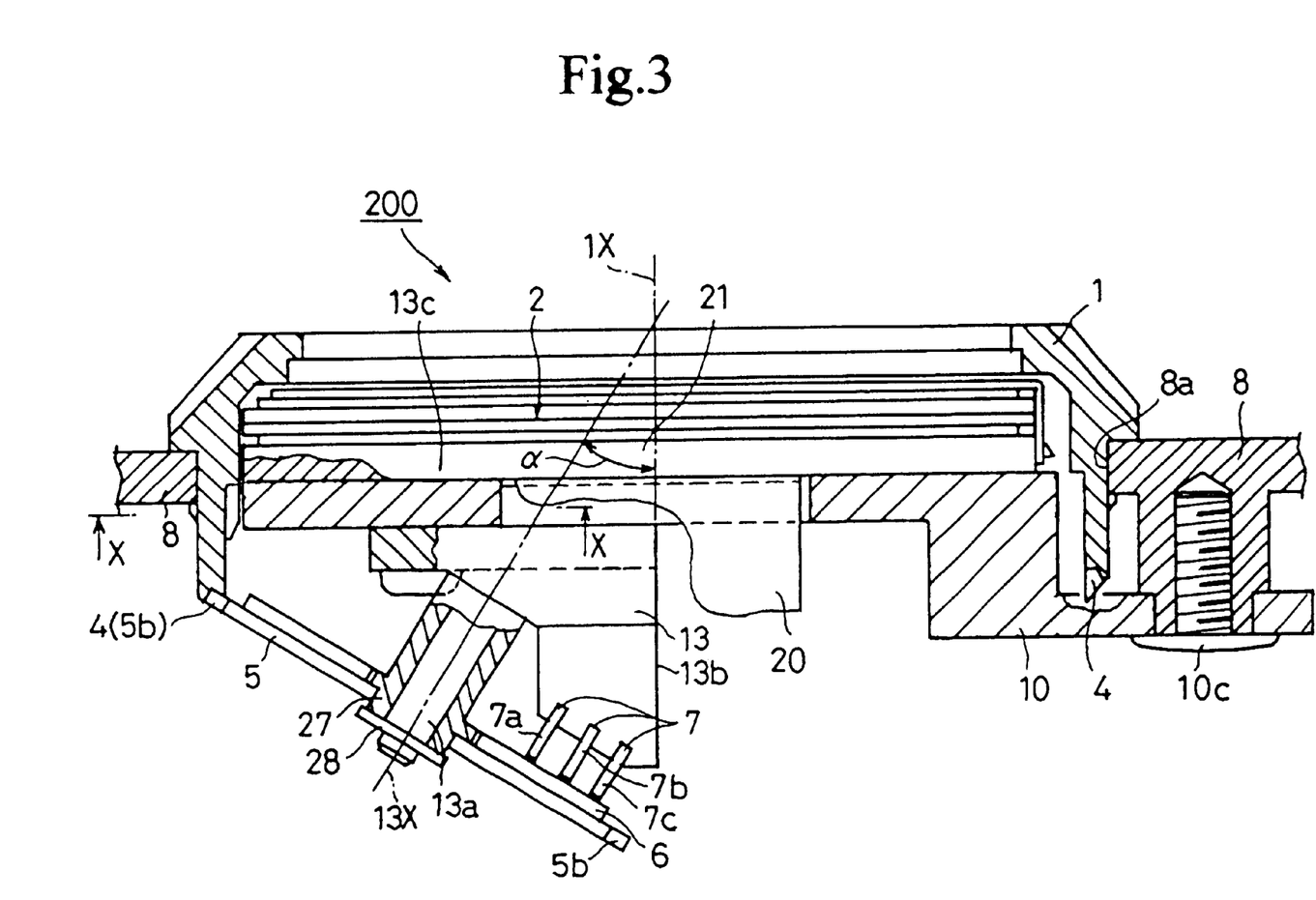
FIG. 3 is a longitudinal cross-sectional view of the first embodiment of the control dial and display panel arrangement.

As shown in FIGS. 2 and 3, a brush holding member 13 having a pivot 13a is fixed to a bottom face of the LCD support 10 via two set screws 13*d*. As can be seen in FIGS. 2 and 3, an axis (second axis) 13X of the pivot 13*a* is inclined to both the bottom face of the LCD support 10 and an axis (first axis) 1X (see FIG. 3) of the control dial 1. The axis 1X extends in a direction substantially perpendicular to the top surface of the top cover 8. The axis 13X of the pivot 13*a* is inclined with respect to the axis 1X of the control dial 1 by an angle α (see FIG. 3). Accordingly, the axis 13X is neither parallel to nor perpendicular to the axis 1X. Therefore, the angle α is greater than 0 degrees and smaller than 90 degrees (0°<α<90°). The angle α is preferably greater than or equal to 25 degrees and less than or equal to 35 degrees (25°≦α≦35°).

A rotational cylinder 27 is fitted on the pivot 13*a* to be rotatable about the axis 13X thereof. The rotational cylinder 27 is prevented from coming off the pivot 13*a* by a lock washer 28 that is fixed at the lower end of the pivot 13*a*.

Figure 4:
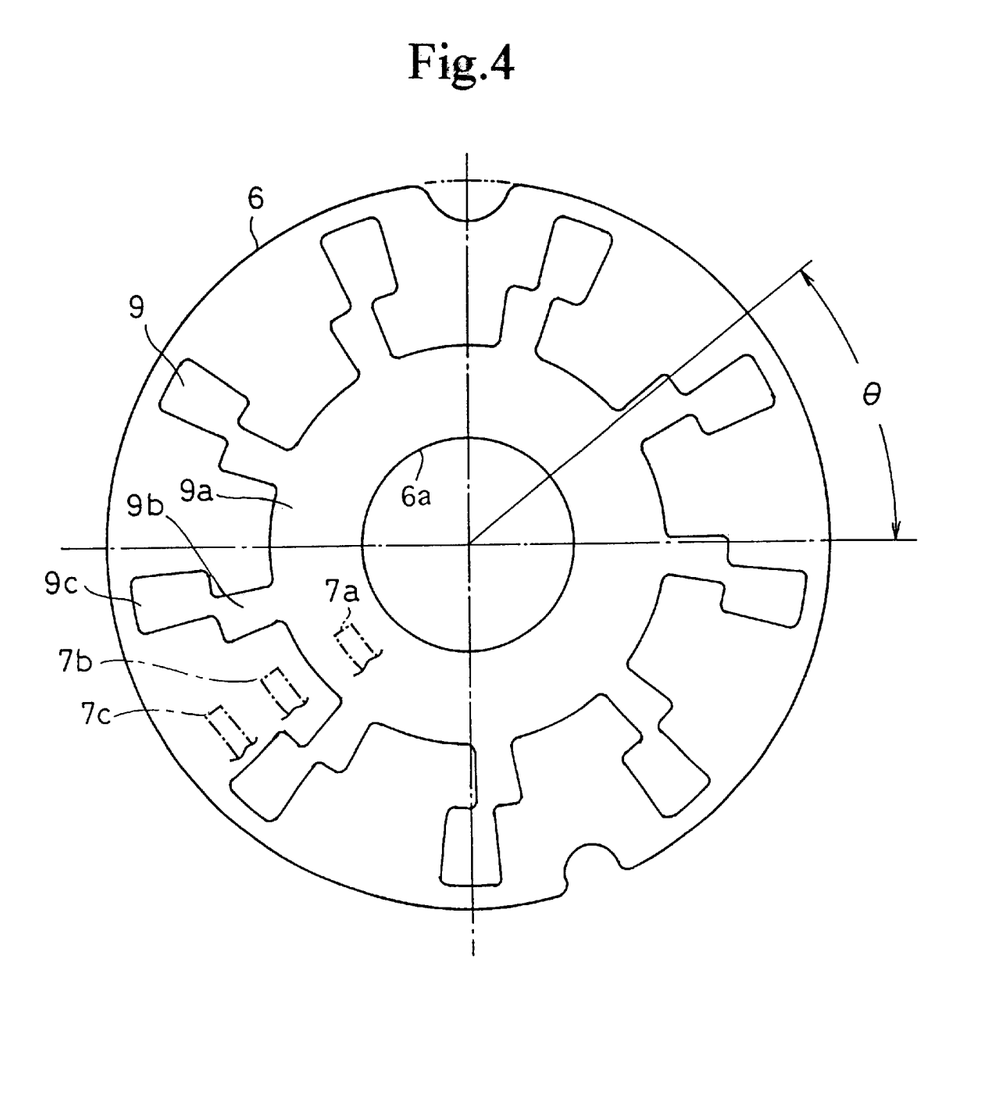
FIG. 4 is a plan view of a code disc having a code pattern thereon.

The rotational cylinder 27 is inserted in a central aperture 5*a* of a rotational disc (a rotational member) 5 and a central aperture 6*a* of a code disc (a code plate) 6. The code disc 6 is cemented to the upper face of the rotational disc 5, while the rotational disc 5 is fixed to the rotational cylinder 27. The rotational disc 5 is provided on the outer edge thereof with an outer gear (second gear) 5*b*. As shown in FIG. 4, a conductive code pattern 9 made of a conductive metal is printed on the code disc 6 in such a manner that the pattern in a radial direction changes at equi-angular intervals of θ degrees (θ=40° in this particular embodiment).

Since the axis 13X of the pivot 13*a* and the axis 1X of the control dial 1 extend neither parallel to nor perpendicular to each other, the rotational disc 5, which is supported by the pivot 13*a*, and the control dial 1 are inclined to each other as shown in FIG. 3. The outer gear 5*b* of the rotational disc 5 is in mesh with the internal gear 4 of the control dial 1. The internal gear 4 and the outer gear 5*b* constitute a transmission device.

The brush holding member 13 is provided with a brush 7 having three electrical contacts (three narrow pieces of conductive metal) 7*a*, 7*b* and 7*c* which come in sliding contact with the conductive code pattern 9 of the code disc 6. Each of the three electrical contacts 7*a*, 7*b* and 7*c* is connected to the microcomputer 11 of the camera via a wire (not shown). The brush 7 and the code disc 6 constitute a detection device.

As shown in FIG. 4, the three electrical contacts 7*a*, 7*b* and 7*c* are arranged on the code disc 6 so as to lie on three concentric circles about the center of the code disc 6, respectively. The conductive code pattern 9 consists of a continuous annular land 9*a*, nine inner radial lands 9*b* and nine outer radial lands 9*c*. The continuous annular land 9*a* remains in contact with the inner electrical contact 7*a* of the brush 7. The nine inner radial lands 9*b* extend radially outwards at equi-angular intervals from the continuous annular land 9*a*, and each inner radial land 9*b* can come into contact with the middle electrical contact 7*b* of the brush 7. The nine outer radial lands 9*c* extend radially outwards at equi-angular intervals from the nine inner radial lands 9*b*, respectively, and each outer radial land 9*c* can come into contact with the outer electrical contact 7*c* of the brush 7. As can be seen in FIG. 4, the nine outer radial lands 9*c* on the code disc 6 are respectively displaced from the nine inner radial lands 9*b* in a circumferential direction by a predetermined angle clockwise as viewed in FIG. 4.

In the state shown in FIG. 4, the inner electrical contact 7*a* is in contact with the continuous annular land 9*a*, while the middle and outer electrical contacts 7*b* and 7*c* are not in contact with any of the nine inner radial lands 9*b* and any of the nine outer radial lands 9*c*, respectively. Accordingly, the inner electrical contact 7*a* is not short-circuited to either the middle or outer electrical contact 7*b* or 7*c*. Starting from the state shown in FIG. 4, if the code disc 6 rotates counter-clockwise by the angle θ (40°), the following four states (first through fourth states) are repeated in the following order:

a first state shown in FIG. 4 in which the inner electrical contact 7*a* is not short-circuited to either the middle or outer electrical contact 7*b* or 7*c*;

a second state in which the inner electrical contact 7*a* is short-circuited to only the middle electrical contact 7*b*;

a third state in which the inner electrical contact 7*a* is short-circuited to both the middle and outer electrical contacts 7*b* and 7*c*; and a fourth state in which the inner electrical contact 7*a* is short-circuited to only the outer electrical contact 7*c*.

Conversely, starting from the state shown in FIG. 4, if the code disc 6 rotates clockwise by the angle θ (40°), the following four states (first through fourth states) are repeated in the following order:

a first state shown in FIG. 4 in which the inner electrical contact 7*a* is not short-circuited to either the middle or outer electrical contact 7*b* or 7*c*;

a second state in which the inner electrical contact 7*a* is short-circuited to only the outer electrical contact 7*c*.

a third state in which the inner electrical contact 7*a* is short-circuited to both the middle and outer electrical contacts 7*b* and 7*c*; and a fourth state in which the inner electrical contact 7a is short-circuited to only the middle electrical contact 7b.

Accordingly, the microcomputer 11 of the camera can detect the rotational position of the code disc 6 from the short-circuit state of the inner, middle and outer electrical contacts 7a, 7b and 7c of the brush 7, and also the direction of rotation of the code disc 6 from the sequence of variation of the short-circuit state of the inner, middle and outer electrical contacts 7a, 7b and 7c.

The microcomputer 11 determines the variation of the rotational angle of the control dial 1 by converting the variation of the rotational angle of the outer gear 5b, which is detected via the brush 7, into the variation of the rotational angle of the control dial 1.

Namely, in the case where the control dial 1 is turned by the user by an angle of a°, the following equation (1) is satisfied:

$$b = a \times m/n (°) \qquad (1)$$

wherein "a" represents the change in the rotational angle of the control dial 1;
"b" represents the change in the rotational angle of the rotational disc 5;
"m" represents the number of teeth of the internal gear 4 of the control dial 1; and
"n" represents the number of teeth of the outer gear 5b of the rotational disc 5.

The microcomputer 11 can determine the direction of rotation of the brush 7 by detecting which of the middle or outer electrical contacts 7b or 7c first contacts the conductive code pattern 9 (inner or outer radial land 9b or 9c), and subsequently, the change "b" in the rotational angle of the rotational disc 5 can be calculated by detecting the number of times "N" the corresponding middle or outer electrical contact 7b or 7c passes the corresponding inner radial land 9b or outer radial land 9c. The following relationship/equation (2) is established between the number of times "N" and the aforementioned variation "b":

$$b = N\theta \qquad (2)$$

Furthermore, the variation "a" of the rotational angle of the control dial 1 is calculated by substituting the value of the variation "b" in equation (1).

The microcomputer 11 can determine the absolute rotational angle of the control dial 1 from the change "b" in the rotational angle of the rotational disc 5, the rotational direction thereof, and the previous absolute rotational angle of the control dial 1 which is stored beforehand in a memory (not shown) provided in the camera. Thereafter, the microcomputer 11 drives the display panel 2 to indicate the determined information corresponding to the absolute rotational angle of the control dial 1 on the display panel 2 via the flexible PWB 20. As can be understood from the above description, according to the present embodiment of the control dial/display panel unit 100, neither the brush 7 nor the brush holding member 13 interferes with the display panel 2 in the inner space of the control dial 1 since the axis 13X of the pivot 13a is neither parallel to nor perpendicular to the axis 1X of the control dial 1, i.e., the axis 13X of the pivot 13a is inclined with respect to the axis 1X of the control dial 1 by the angle α (0°<α<90°). Due to this structure, the large display panel 2 is successfully employed in the present embodiment of the control dial/display panel unit 100 by designing, e.g., the perimeter of the display panel 2 to have a polygonal shape (an octagonal shape in this particular embodiment) in such a manner that the perimeter of the display panel 2 is positioned closely to the inner peripheral surface of the control dial 1 without coming in contact therewith. The display panel 2 can be made sufficiently large by being designed to have a plane octagonal shape, or a plane polygonal shape having more than eight sides. The aforementioned angle α between the axis 13X of the pivot 13a and the axis 1X of the control dial 1 is preferably greater than or equal to 25 degrees and less than or equal to 35 degrees (25°≦α≦35°) as mentioned above. If the angle α is less than the angle 25°, either the brush 7 or the brush holding member 13 will interfere with the display panel 2 in the inner space of the control dial 1. If the angle a is greater than the angle 35°, the control dial/display panel unit will not be small in size.

Figure 5:
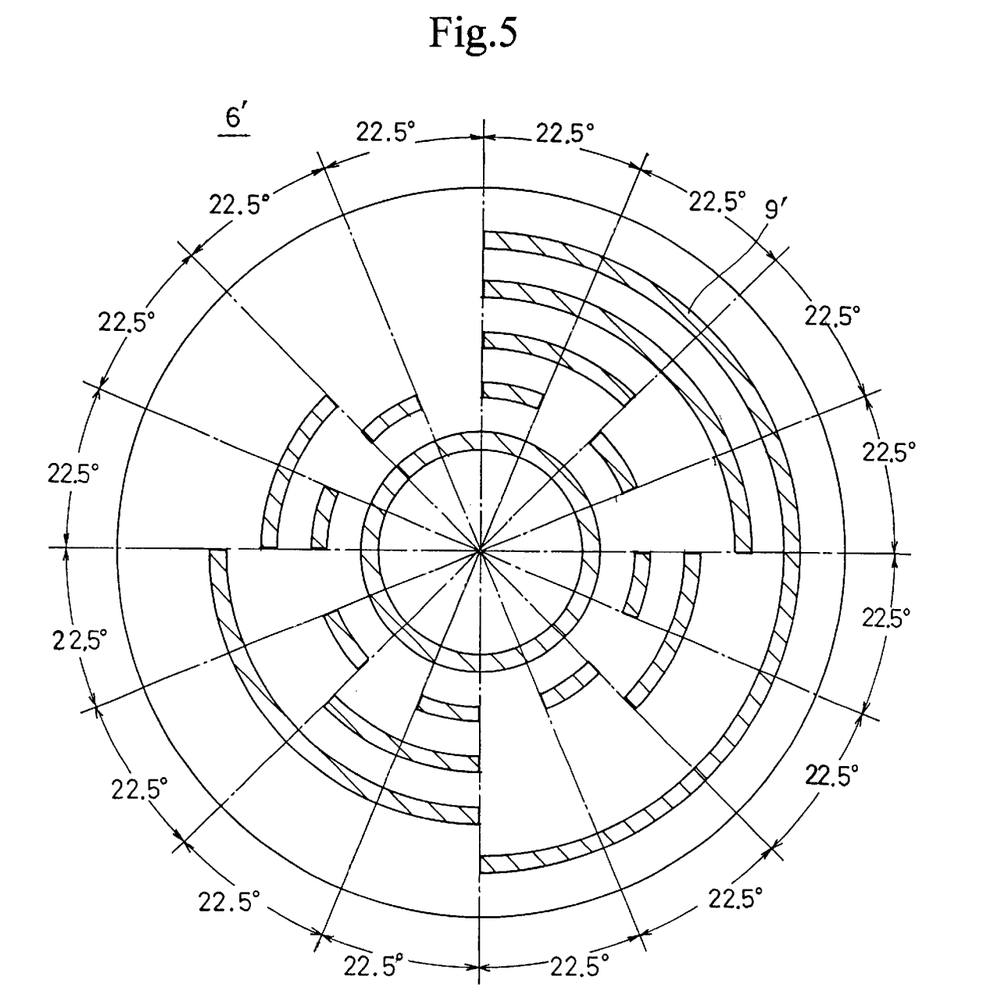
FIG. 5 is a plan view of another embodiment of a code disc having a code pattern thereon by which the absolute rotational angle of the code disc can be detected.

FIG. 5 shows another embodiment of the code disc having a code pattern with which the absolute rotational angle of the code disc can be detected. With this code disc (a code plate) 6', the absolute rotational angle of the control dial 1 can be determined from the absolute rotational angle of the code disc 6'.

The code disc 6' is provided with a conductive code pattern 9' (shown by diagonally shaded areas in FIG. 5) made of a conductive metal which is printed on the code disc 6' in such a manner that the pattern in a radial direction changes at predetermined equi-angular intervals (intervals of 22.5 degrees in this particular embodiment). The conductive code pattern 9' is provided with a plurality of arc conductive lands which are arranged in a predetermined pattern on five concentric circles having different diameters about the center of the code disc 6'. In this embodiment, a brush (not shown) corresponding to the brush 7 shown in FIGS. 2 and 3 is provided with five electrical contacts which come in sliding contact with the conductive code pattern 9' on the aforementioned five concentric circles thereon to detect the absolute rotational angle of the code disc 6'.

Figure 6:
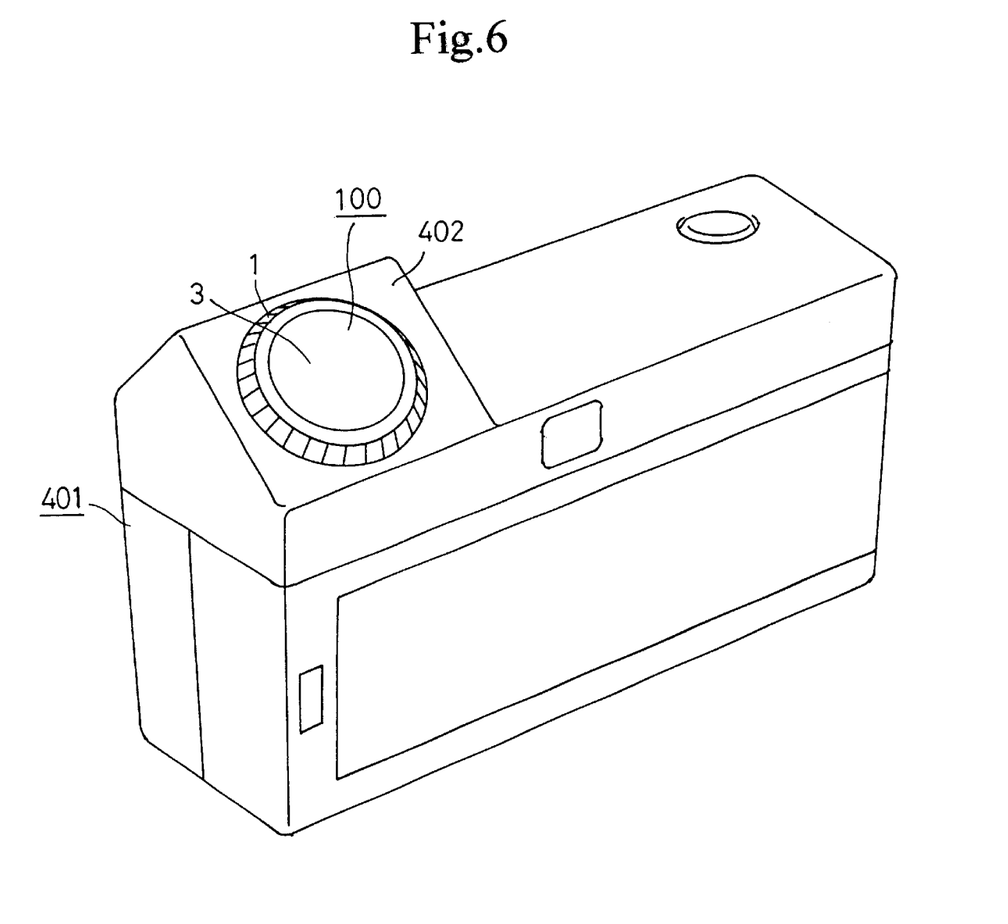
FIG. 6 is a perspective view of another embodiment of the camera on which the first embodiment of the control dial and display panel arrangement is provided, wherein the control dial and display panel are obliquely positioned on a sloped top panel of the camera.

Since the fundamental elements of the control dial/display panel unit 100 such as the display panel 2, the rotational disc 5 and the brush 7 are all mounted to the top cover 8 of the camera in the above illustrated embodiment, in an alternative embodiment, the control dial/display panel unit 100 can be mounted obliquely to a top cover 402 of a camera 401, as shown in FIG. 6. In this case where the control dial/display panel unit 100 is inclined with respect to the horizontal major part of the top cover 402 of the camera 401 (i.e., where the axis 1X of the control dial 1 is inclined with respect to the vertical direction of the camera), the axis 13X of the rotational disc 5 can be oriented to extend in the vertical direction of the camera 401. This corresponds to a state of the control dial/display panel unit 100 shown in FIG. 3 where the axis 1X is oriented to extend in the vertical direction of the camera. Since internal elements of the camera are generally arranged with reference to a horizontal or vertical direction of the camera, the control dial/display panel unit 100 can be obliquely designed according to such a conventional manner of arrangement with the rotational disc 5 horizontally arranged (i.e., with the axis 13X of the rotational disc 5 being orientated to extend vertically) by tilting the control dial/display panel unit 100 so that the axis 1X thereof is inclined with respect to the vertical direction of the camera.

FIGS. 7 through 10 show the second embodiment of the control dial/display panel unit 200 for a camera. Parts or elements of the second embodiment which are substantially identical to those in the first embodiment are designated by the same reference numerals, and accordingly will not be hereinafter described in detail.

Figure 7:
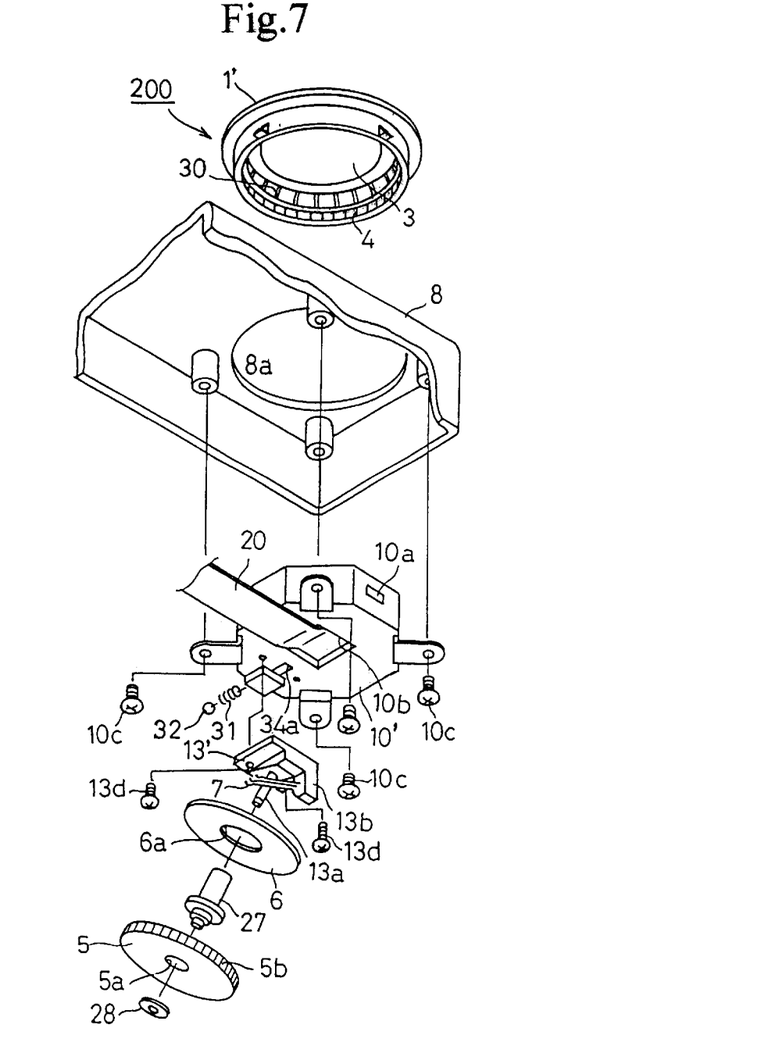
FIG. 7 is an exploded perspective view of fundamental elements of the second embodiment of the control dial and display panel arrangement which is provided on a camera, according to the present invention.
Figure 8:
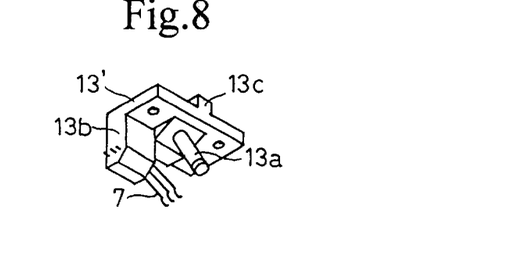
FIG. 8 is a perspective view of a brush holding member shown in FIG. 7.

The second embodiment of the control dial/display panel unit 200 has the same structure as the first embodiment of the control dial/display panel unit 100, and an additional structure which provides a control dial (a ring member) 1', which corresponds to the control dial 1 of the first embodiment, with clicking action upon rotation thereof (via a click mechanism) which prevents the control dial 1' from rotating unintentionally. In addition to the internal gear 4, the control ring 1' is provided, on an inner peripheral surface thereof above the internal gear 4, with a plurality of notches 30 at equi-angular intervals.

An LCD support 10', which corresponds to the LCD support 10 of the first embodiment, is provided with a radial hole 34 in which a compression coil spring (a biasing member) 31 and a steel ball 32 are accommodated. The radial hole 34 opens on a bottom surface of the LCD support 10' at one end (radially-inner end) of the radial hole 34 to form a bottom opening (an insertion opening) 34a, and opens on an outer peripheral surface of the LCD support 10' at the other end (radially-outer end) of the radial hole 34. The steel ball 32 and the compression coil spring 31 can be inserted into the radial hole 34 from the bottom opening 34a thereof in that order. The notches 30, the compression coil spring 31, and the steel ball 32 constitute a click mechanism.

Figure 9:
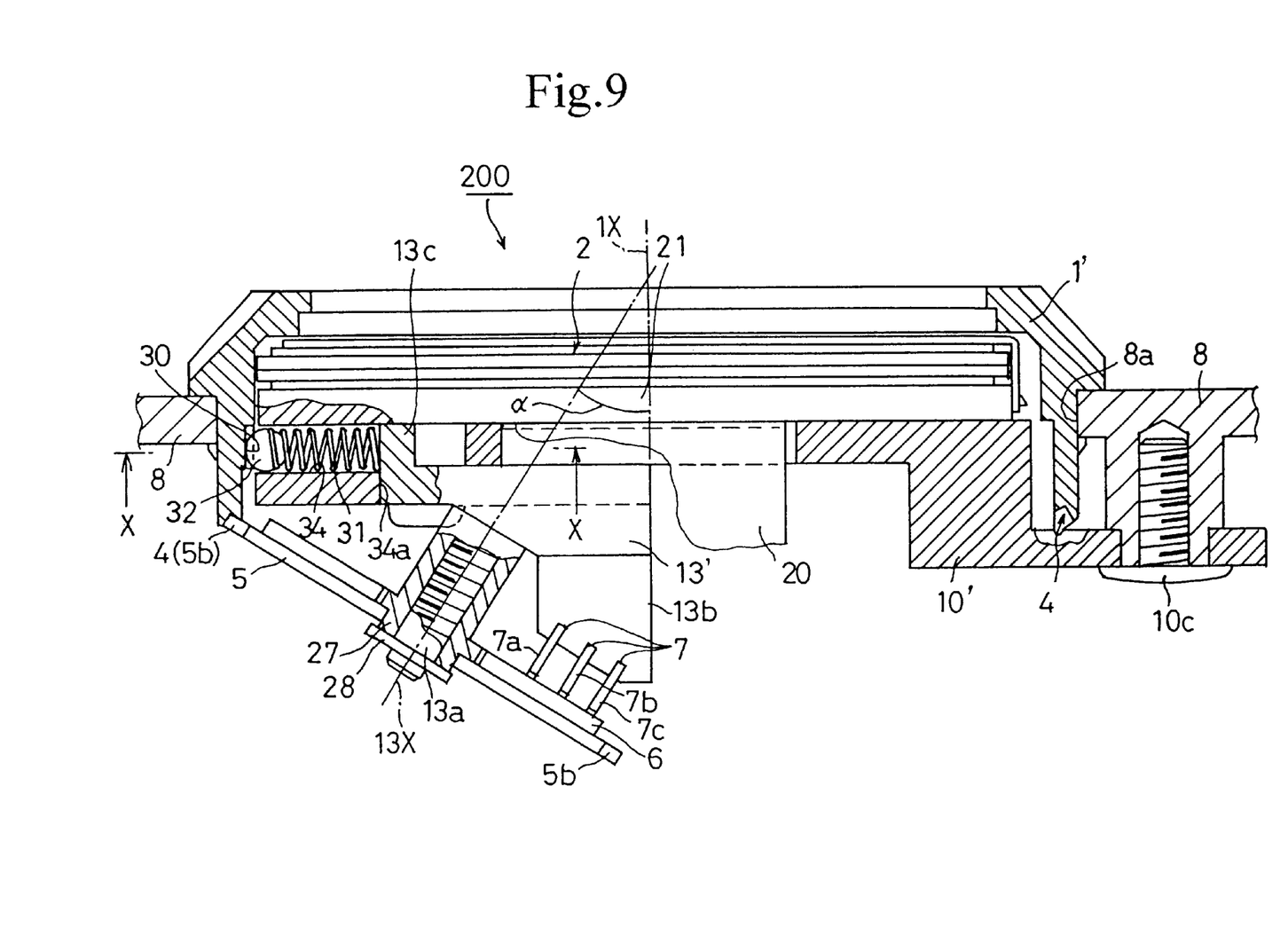
FIG. 9 is a longitudinal cross-sectional view of the second embodiment of the combination of the control dial and the display panel.
Figure 10:
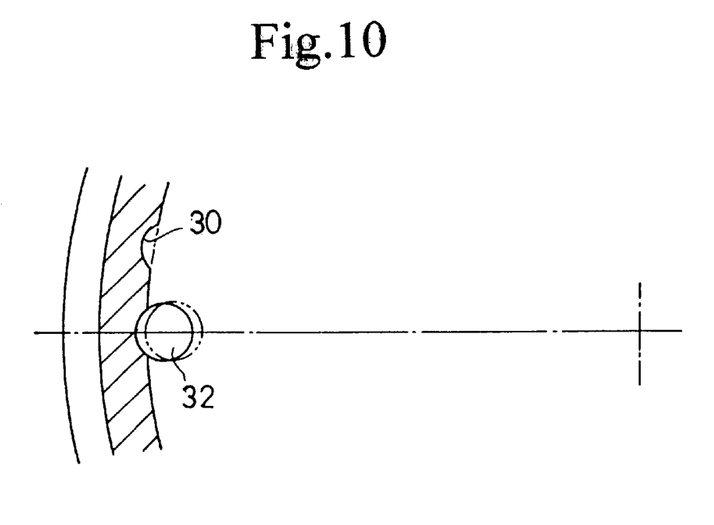
FIG. 10 is a cross-sectional view of a fundamental portion of the control dial shown in FIGS. 7 and 8, taken along the X—X line in FIG. 9, viewed in the direction of the appended arrows.

A brush holding member 13', which corresponds to the brush holding member 13 of the first embodiment, has the same structure as the brush holding member 13 of the first embodiment except that the brush holding member 13' is further provided on a top surface thereof with a protrusion 13c (see FIG. 8) which can be engaged in the bottom opening 34a. After the protrusion 13c of the brush holding member 13' is inserted into the radial hole 34 from the bottom opening 34a, the steel ball 32 and the compression coil spring 31 are prevented from coming out of the radial hole 34 from the bottom opening 34a by the protrusion 13c. The protrusion 13c is engaged in the bottom opening 34a when the brush holding member 13' is properly fixed to a bottom face of the LCD support 10' via two set screws 13d. As can be seen in FIGS. 9 and 10, the compression coil spring 31 biases the steel ball 32 outwardly in a radial direction from the axis 1X of the control dial 1' so that the steel ball 32 comes into pressing contact with any one of the plurality of notches 30. This structure provides the control dial 1' with the above-mentioned clicking action, and prevents the control dial 1' from rotating unintentionally.

As can be understood from the above descriptions, the brush holding member 13' is used as a device for preventing the compression coil spring 31 and the steel ball 32 from coming out of the radial hole 34 from the bottom opening 34a. This structure makes it possible to achieve a simple mechanism which provides the control dial 1' with a clicking action upon rotation thereof while preventing the control dial 1' from rotating unintentionally.

In each of the above described first and second embodiments of the control dial/display panel units 100 and 200, the LCD display panel 2 having the LCD 23 can be substituted by an LED display panel.

As can be understood from the foregoing, according to each of the above described first and second embodiments of the control dial/display panel units, the rotational position of the control dial can be detected at close intervals with fine precision, and the display panel, which is surrounded by the control dial, can be a large display panel. Furthermore, the camera can be provided with a simple mechanism which provides the control dial with a clicking action upon rotation thereof while preventing the control dial from rotating unintentionally.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera having a control dial/display panel unit, said control dial/display panel unit comprising:
   a ring member which can be manually rotated about a first axis;
   a display panel which is surrounded by said ring member so as to be viewed through an aperture of said ring member from outside said camera;
   a rotational member which is rotatable about a second axis which is inclined with respect to said first axis;
   a transmission device for transmitting the rotation of said ring member to said rotational member;
   a detection device which is disposed on said rotational member to detect rotation information of said rotational member; and
   a controller which determines rotation information of said ring member via said rotation information of said rotational member, which is detected by said detection device, to indicate information corresponding to said rotation information of said ring member on said display panel.

2. The camera according to claim 1, wherein said rotation information of said ring member comprises information on a direction of rotation of said ring member.

3. The camera according to claim 1, wherein said rotation information of said ring member comprises information on a rotational angle of said ring member.

4. The camera according to claim 1, wherein said rotation information of said ring member comprises information on an absolute rotational angle of said ring member.

5. The camera according to claim 1, further comprising a transparent window plate which is fitted in said aperture of said ring member.

6. The camera according to claim 1, wherein said display panel has a polygonal shape including at least eight sides, the perimeter of said display panel being positioned closely to an inner peripheral surface of said ring member without coming in contact therewith.

7. The camera according to claim 1, wherein said transmission device comprises a first gear formed on an inner peripheral surface of said ring member, and a second gear which is formed on an outer peripheral surface of said rotational member to be in mesh with said first gear.

8. The camera according to claim 1, wherein said detection device comprises:
   a code plate having a predetermined conductive code pattern, said code plate being mounted to said rotational member; and
   a brush which comes into contact with said predetermined conductive code pattern.

9. The camera according to claim 8, further comprising:
   a plurality of notches formed on an inner peripheral surface of said ring member;
   a support which supports said display panel;
   a hole formed on said support;
   a ball positioned in said hole;
   a biasing member positioned in said hole to bias said ball toward said inner peripheral surface of said ring member so that said ball can be engaged in one of said plurality of notches with a click; and
   a brush holding member which holds said brush;

wherein said support comprises an insertion opening which communicatively connects with said hole so that said ball and said biasing member can be inserted into said hole via said insertion opening; and wherein said brush holding member comprises a protrusion which is engaged in said insertion opening to prevent said ball and said biasing member from coming out of said hole via said insertion opening.

10. The camera according to claim 9, wherein said biasing member comprises a compression coil spring.

11. The camera according to claim 1, wherein said ring member, said rotational member and said detection device are mounted to an external cover of said camera.

12. The camera according to claim 1, wherein said second axis is inclined with respect to said first axis by an angle which is one of greater than and equal to 25 degrees and is one of less than and equal to 35 degrees.

13. The camera according to claim 12, wherein said first axis is inclined with respect to a vertical direction of said camera.

14. The camera according to claim 13, wherein said second axis extends in substantially a vertical direction of said camera.

15. The camera according to claim 1, wherein said display panel comprises an LCD.

16. The camera according to claim 1, wherein said rotational member is in the shape of a disc.

17. The camera according to claim 1, further comprising a click mechanism which provides said ring member with a clicking action upon rotation thereof which prevents said ring member from being rotated unintentionally.

18. The camera according to claim 6, wherein said display panel has an octagonal shape.

19. The camera according to claim 9, wherein said brush holding member is fixed to said support, said rotational member being mounted to said support via said brush holding member.

20. The camera according to claim 9, wherein said plurality of notches are formed on said inner peripheral surface of said ring member at equi-angular intervals.

21. The camera according to claim 9, wherein said brush holding member is fixed to a bottom surface of said support.

22. The camera according to claim 9, further comprising a rotational cylinder to which said rotational member is fixed;

wherein said brush holding member comprises a pivot on which said rotational cylinder is fitted to be rotatable about said pivot.

23. The camera according to claim 9, wherein said ring member comprises a first gear formed on an inner peripheral surface of said ring member;

wherein said rotational member comprises a second gear which is formed on an outer peripheral surface of said rotational member to be in mesh with said first gear; and wherein said plurality of notches are formed along a circumference of said ring member above said first gear.

24. A control dial/display panel unit, comprising:

a ring member which can be manually rotated;

a display panel which is surrounded by said ring member so as to be viewed through an aperture of said ring member from outside said camera;

a rotational disc positioned below said display panel obliquely to said ring member;

a transmission device for transmitting rotation of said ring member to said rotational disc; and a detection device which detects information on rotation of said rotational disc;

wherein said display panel indicates information corresponding to rotation information of said ring member which is determined via rotation information of said rotational disc which is detected by said detection device.

\* \* \* \* \*